US009435677B1

United States Patent
Soble et al.

(10) Patent No.: US 9,435,677 B1
(45) Date of Patent: Sep. 6, 2016

(54) LIQUID CONTAINMENT AND MEASUREMENT APPARATUS AND METHOD

(71) Applicant: Diamond Shine, Inc., Wickliffe, OH (US)

(72) Inventors: David Soble, Solon, OH (US); Scott Soble, Solon, OH (US); Derek Grace, Reading, OH (US); Brian L. Ashinger, Cincinnati, OH (US)

(73) Assignee: Diamond Shine, Inc., Wickliffe, OH (US)

( * ) Notice: Subject to any disclaimer, the term of this patent is extended or adjusted under 35 U.S.C. 154(b) by 0 days.

(21) Appl. No.: 14/792,001

(22) Filed: Jul. 6, 2015

Related U.S. Application Data

(63) Continuation-in-part of application No. 29/527,435, filed on May 19, 2015, now Pat. No. Des. 740,390.

(60) Provisional application No. 62/131,895, filed on Mar. 12, 2015.

(51) Int. Cl.
*G01F 23/02* (2006.01)
*G01F 11/28* (2006.01)

(52) U.S. Cl.
CPC ............... *G01F 23/02* (2013.01); *G01F 11/28* (2013.01)

(58) Field of Classification Search
CPC ...... G01F 23/02; G01F 11/28; G01F 11/282; G01F 11/284; G01F 11/286; G01F 11/288
USPC ......... 73/323, 324, 325, 326, 327, 328, 329, 73/330, 331, 332, 333, 334
See application file for complete search history.

(56) References Cited

U.S. PATENT DOCUMENTS

| | | | | |
|---|---|---|---|---|
| 231,363 A * | 8/1880 | Schwarb | ................... | A24B 3/02 131/300 |
| 507,055 A * | 10/1893 | Wilson | ................... | A47G 19/12 220/761 |
| 994,333 A * | 6/1911 | Orth et al. | ........... | B67D 7/3254 114/74 A |
| 1,886,179 A * | 11/1932 | Meade | ................... | G01F 23/02 73/326 |
| 2,286,919 A * | 6/1942 | McNeill | ................... | G01F 23/02 73/299 |
| 3,141,574 A * | 7/1964 | Donoghue | ............ | G01F 11/084 222/157 |
| 3,174,338 A | 3/1965 | Bower et al. | | |
| 3,410,438 A | 11/1968 | Bartz | | |
| 3,602,607 A * | 8/1971 | Hodges | ..................... | G01J 1/42 222/432 |
| 3,659,458 A * | 5/1972 | Bice | ........................ | G01F 23/58 73/306 |

(Continued)

FOREIGN PATENT DOCUMENTS

GB 2057283 A 4/1981
GB 2057283 B 4/1981

*Primary Examiner* — Robert Huber
*Assistant Examiner* — Herbert K Roberts
(74) *Attorney, Agent, or Firm* — Taft Stettinius & Hollister LLP; Stephen F. Rost

(57) ABSTRACT

A car wash liquid containment and measurement apparatus having a reservoir defining a first interior region configured to hold a liquid therein. The apparatus has a valve with a first position and a second position and the valve is coupled to the reservoir. There is also a measurement apparatus coupled to the valve defining a second interior region and a tube disposed at least partially within the second interior region of the measurement apparatus. The valve fluidly isolates the first interior region from the second interior region when the valve is in the first position and the valve fluidly couples the first interior region with the second interior region when the valve is in the second position.

20 Claims, 10 Drawing Sheets

(56) References Cited

U.S. PATENT DOCUMENTS

| | | | |
|---|---|---|---|
| D225,126 S | 11/1972 | Coleman et al. | |
| D226,902 S | 5/1973 | Evander | |
| 3,760,981 A * | 9/1973 | Weed | G01F 11/28 222/14 |
| 3,895,522 A * | 7/1975 | Skvarenina | G01F 23/02 73/323 |
| 4,131,438 A | 12/1978 | Debrotnic | |
| 4,284,210 A * | 8/1981 | Horak | B67D 7/08 222/14 |
| 4,301,841 A | 11/1981 | Sandow | |
| 4,433,577 A * | 2/1984 | Khurgin | A01J 5/01 119/14.17 |
| D293,087 S | 12/1987 | Grinde | |
| D293,655 S | 1/1988 | Phillips et al. | |
| 4,822,054 A | 4/1989 | Christner et al. | |
| 4,856,343 A * | 8/1989 | Hon | G01F 1/007 73/168 |
| 4,924,923 A | 5/1990 | Boehmer et al. | |
| D331,094 S | 11/1992 | Sterett | |
| 5,320,147 A | 6/1994 | Jamrog | |
| 5,385,180 A | 1/1995 | Wittman | |
| D387,295 S | 12/1997 | Krikorian | |
| 5,878,795 A | 3/1999 | Armellino | |
| 5,950,688 A | 9/1999 | Langlois | |
| 6,082,591 A * | 7/2000 | Healey | B65D 1/023 222/158 |
| 6,189,377 B1 * | 2/2001 | Schoeffel | F02M 65/001 73/114.45 |
| 6,698,284 B1 | 3/2004 | Evans | |
| 7,574,897 B2 | 8/2009 | Koike et al. | |
| 7,610,807 B2 | 11/2009 | Skinner | |
| D647,168 S | 10/2011 | Lerner et al. | |
| D647,996 S | 11/2011 | Griffin | |
| D652,479 S | 1/2012 | Theiss | |
| 8,756,972 B2 | 6/2014 | Murnane, Jr. et al. | |
| D710,968 S | 8/2014 | Colbert | |
| D724,177 S | 3/2015 | Lee et al. | |
| 2003/0010115 A1 * | 1/2003 | Kelley | G01F 23/02 73/290 V |
| 2003/0172872 A1 * | 9/2003 | Thakur | C23C 16/4412 118/715 |
| 2004/0164092 A1 * | 8/2004 | DiLeo | B67D 1/1234 222/64 |
| 2004/0237878 A1 * | 12/2004 | Bucksch | A47G 23/16 116/227 |
| 2007/0125171 A1 * | 6/2007 | Tanaka | G01F 23/02 73/290 R |
| 2008/0179344 A1 * | 7/2008 | Michaels | G01F 23/0053 222/20 |
| 2009/0308893 A1 * | 12/2009 | Hettinga | B67D 1/0406 222/155 |
| 2011/0011891 A9 | 1/2011 | Hettinga | |
| 2011/0097244 A1 * | 4/2011 | Eaton | B01J 19/0013 422/138 |
| 2011/0204086 A1 * | 8/2011 | Karam | B67D 7/08 222/25 |
| 2012/0036927 A1 * | 2/2012 | Sanders | G01F 23/02 73/291 |
| 2015/0007408 A1 * | 1/2015 | Wyland | B08B 9/00 15/302 |

* cited by examiner

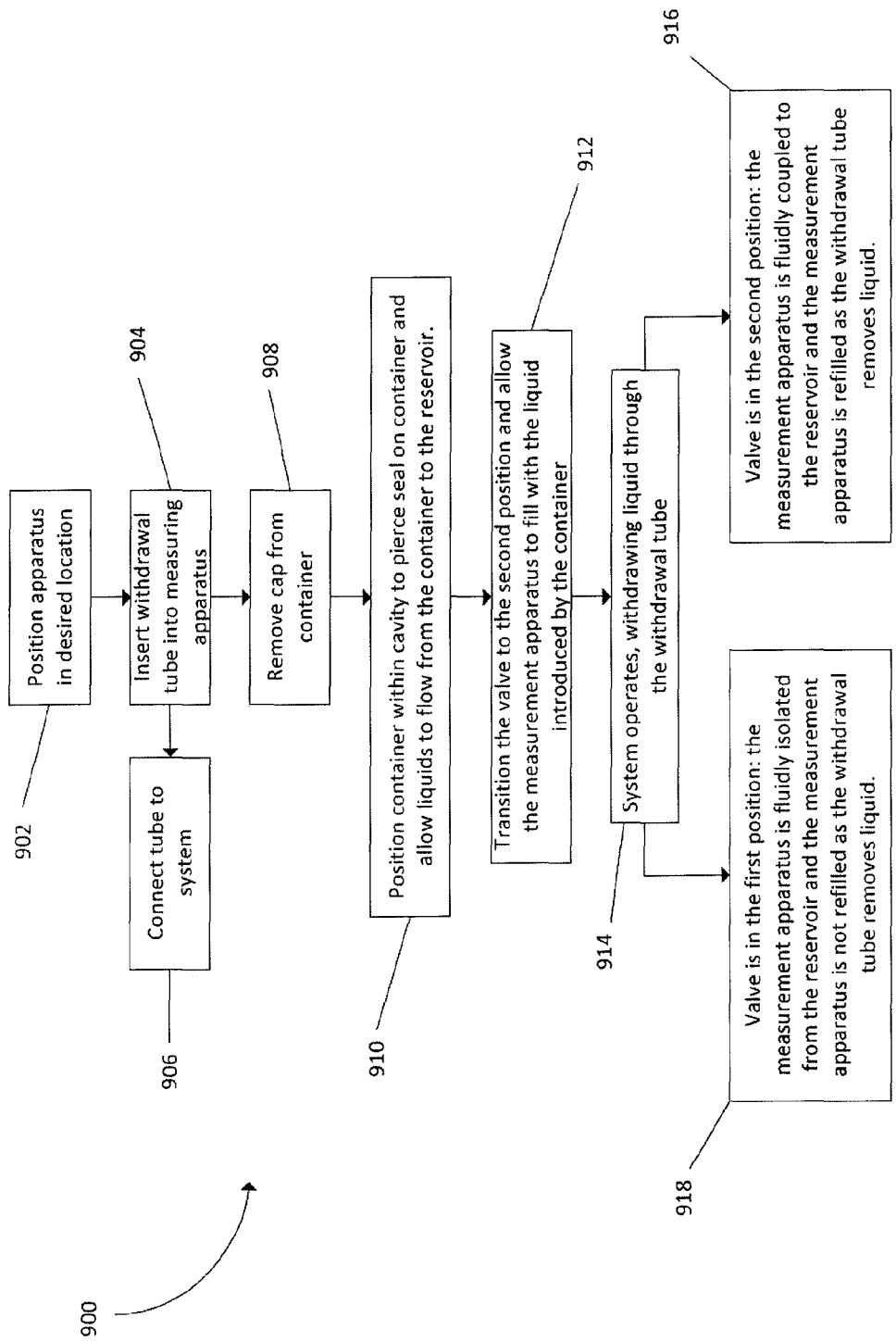

LIQUID CONTAINMENT AND MEASUREMENT APPARATUS AND METHOD

CROSS-REFERENCE TO RELATED APPLICATIONS

This application claims priority to U.S. Provisional Application Ser. No. 62/131,895, filed Mar. 12, 2015 and entitled "Car Wash Chemical Containment and Measurement Apparatus and Method," and is a continuation in part of U.S. Design Application No. 29/527,435 filed May 19, 2015 and entitled "Fluid Tank," the disclosures which are hereby incorporated by reference in their entirety.

FIELD OF THE DISCLOSURE

The present disclosure relates to a system and method for containing and measuring chemicals, and more specifically chemicals being withdrawn from a reservoir.

BACKGROUND

A typical drive-thru car wash consists of a series of hoses, cleaning elements, sprayers, and fans that may automatically execute a cleaning process on a vehicle. A drive-thru car wash can either utilize brushes or be brushless depending on the setup of the car wash.

In a drive-thru car wash utilizing brushes, there is typically a plurality of different kinds of brushes that may provide physical contact with a vehicle driving therethrough. The brushes may extend radially away from a rotating axis and provide for a repetitive contact with the vehicle when it is within the range of the brushes. The car wash may also have brushes that fall from an oscillating frame. The brushes may contact the vehicle as they oscillate back and forth with the frame. Both the rotating brushes and the oscillating brushes utilize water and/or a cleaning compound sprayed onto the vehicle or applied by the brushes to aid in removing dirt and grime.

In a drive-thru car wash utilizing a brushless system, high-powered jets may spray the vehicle with water, a cleaning agent, and/or soap to remove the dirt or grime. In this type of car wash, the jets are strategically placed to sufficiently spray the areas of the vehicle that are most susceptible to accumulating debris. Additionally, there may be many different jet stations. Each jet station, may execute a different step in the car wash process. For example, a first jet station may rinse the entire vehicle with water, a next station may spray the vehicle with a high pressure water/cleaning agent composition, and a final station may spray the vehicle with a water/rinsing agent composition.

In either the brushless system or the brush system, the drive-thru car wash may have a forced air drying system. This drying system utilizes a plurality of fans to provide high-speed air drying to the surface of the vehicle prior to leaving the drive-thru car wash. Alternatively, some drive-thru car washes apply a spot-free rinse to the vehicle as a final step. After the spot-free rinse is applied, the vehicle is intended to dry clearly without utilizing high-speed air drying.

All types of drive-thru car wash processes incorporate the use of chemicals to adequately clean the vehicle. Many drive-thru car wash stations utilize many different chemicals during the car was process. For example, a different chemical composition may be used in the car wash to provide a waxing affect, a wheel cleaner, an underbody wash, a clear coat, a tire cleaner, and/or a spot-free rinse. Typically the chemicals used to provide the various car wash features are maintained in a concentrated form. When the particular chemical providing the desired feature is needed, it is drawn from a reservoir and diluted with the appropriate amount of water prior to being dispensed onto the vehicle.

The cost of the car wash often depends on the lost volume of chemicals used to execute the wash and the cost of each chemical. Accurately determining the expense of a car wash process requires knowing precisely the lost volume of each chemical used for each car wash process.

SUMMARY

This disclosure relates to a liquid measurement and containment apparatus, including a reservoir defining a first interior region configured to hold a liquid therein. The apparatus has a valve having a first position and a second position and the valve is coupled to the reservoir. There is also a measurement apparatus coupled to the valve defining a second interior region and a tube disposed at least partially within the second interior region of the measurement apparatus. The valve fluidly isolates the first interior region from the second interior region when the valve is in the first position and the valve fluidly couples the first interior region with the second interior region when the valve is in the second position.

In a different embodiment, an assembly for monitoring the volume of liquid used in a system is disclosed. The system includes a machine that uses at least one fluid, and a liquid measurement and containment apparatus. The liquid measurement and containment apparatus further includes a reservoir defining a first interior region configured to hold a liquid therein, a valve having a first position and a second position, the valve coupled to the reservoir, a measurement apparatus coupled to the valve defining a second interior region, and a tube disposed at least partially within the second interior region of the measurement apparatus. The valve fluidly isolates the first interior region from the second interior region when the valve is in the first position and the valve fluidly couples the first interior region with the second interior region when the valve is in the second position. Further, the tube fluidly couples the machine to liquid measurement and containment apparatus.

Another aspect of the present disclosure involves a method of determining the liquid consumption of a machine. The method involves providing a liquid measurement and containment apparatus having a reservoir defining a first interior region configured to hold a liquid therein, a valve having a first position and a second position, the valve coupled to the reservoir, a measurement apparatus coupled to the valve defining a second interior region, and a tube disposed at least partially within the second interior region of the measurement apparatus. The valve fluidly isolates the first interior region from the second interior region when the valve is in the first position and fluidly couples the first interior region with the second interior region when the valve is in the second position. The method further involves providing a machine that uses at least one liquid during a machine operation, fluidly coupling the machine to the measurement apparatus with the tube, filling the reservoir with a volume of a liquid, transitioning the valve to the second position to allow the liquid to enter the measurement apparatus, transitioning the valve to the first position after at least some of the liquid has entered the measurement apparatus, recording a first liquid height in the measurement apparatus, operating the machine for a period of time, recording a second liquid height of the measurement apparatus, and comparing the first liquid height to the second liquid height to determine the amount of liquid used by the machine during a machine operation.

BRIEF DESCRIPTION OF THE DRAWINGS

The above-mentioned aspects of the present disclosure and the manner of obtaining them is more apparent and the disclosure itself is better understood by reference to the following description of the embodiments of the disclosure, taken in conjunction with the accompanying drawings, wherein:

FIG. 9 is a block diagram showing another embodiment of a method of using the liquid containment and measurement apparatus in a system.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1A:
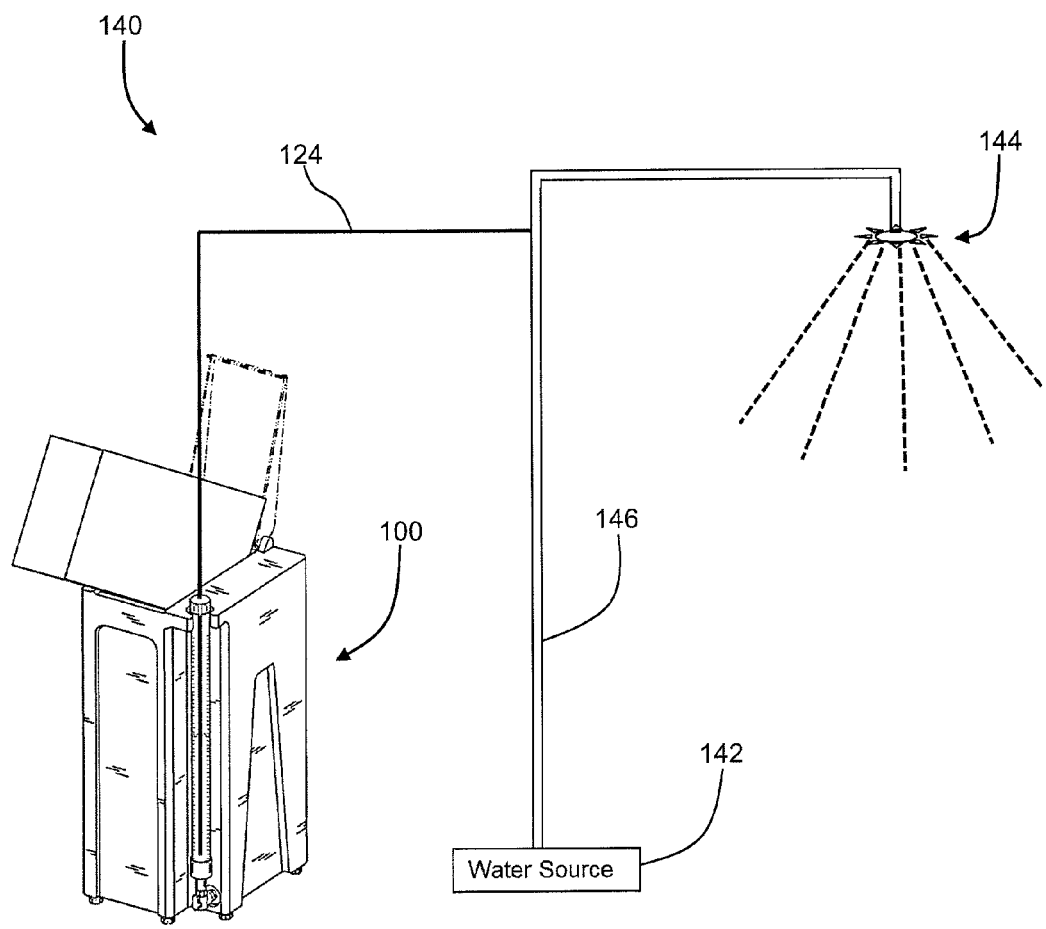
FIG. 1a is one embodiment of a system incorporating a liquid containment and measurement apparatus.

A liquid mixture and distribution system 140 is shown in FIG. 1a. The system may have a base water source 142 that can selectively provide pressurized water to a nozzle 144 through a main line 146. Between the water source 142 and the nozzle 144, a tube 124 may be fluidly coupled to the main line 146 on one end and to a measurement and containment apparatus 100 on the other end. The measurement and containment apparatus 100 may contain a liquid therein. The tube 124 may selectively introduce the liquid into the main line 146 to route the liquid with the water from the water source 142 prior to being dispersed from the nozzle 144. In one embodiment, a pump (not shown) may be fluidly coupled to the tube 124 to provide sufficient pressure to selectively introduce the liquid into the main line 146.

The measurement and containment apparatus 100 can be used in many other applications other than the liquid distribution system 140 shown in FIG. 1a. More specifically, the measurement and containment apparatus 100 may introduce a fluid into a large reservoir instead of a pressurized main line 146 as described above. The measurement and containment apparatus 100 of this disclosure is not limited to the liquid distribution system 140 as described above.

In one embodiment, the liquid in the measurement and containment apparatus 100 is a concentrated liquid that is mixed with a second liquid prior to being dispersed. For example, the liquid could be a concentrated detergent, rinse aid, presoak liquid, tire cleaner, surfactant, wax or the like that should be mixed with the second liquid (in many cases water) prior to being dispersed through the nozzle 144. While embodiments incorporating a liquid for cleaning have been disclosed herein, this disclosure should not be limited to such embodiments. The teachings of this disclosure are equally applicable to any liquid that is consumed or otherwise used in a system.

Figure 1B:
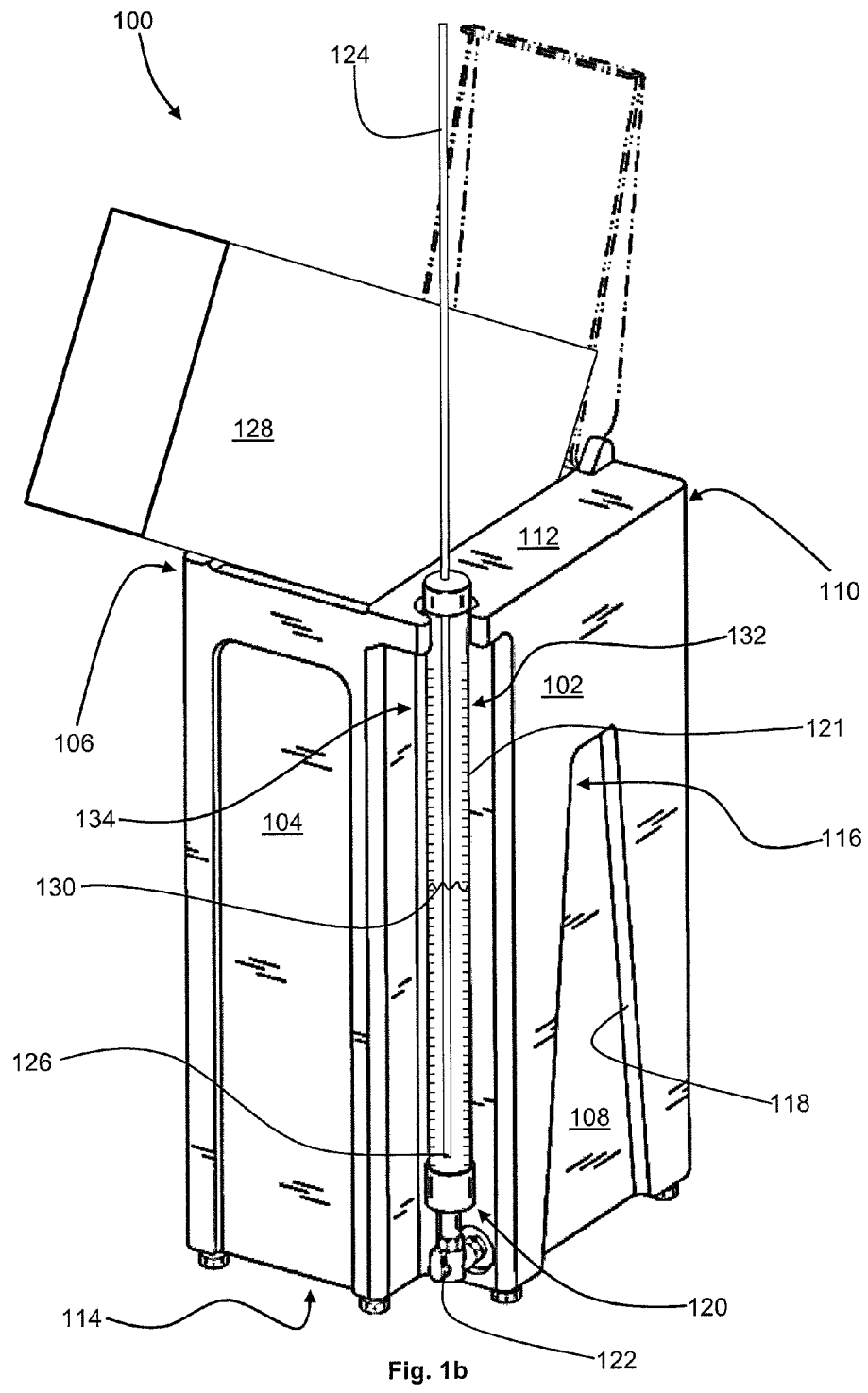
FIG. 1b is an elevated perspective view of the liquid containment and measurement apparatus with a liquid container thereon.

Referring now to FIG. 1b, an elevated perspective view of the measurement and containment apparatus 100 is shown. The measurement and containment apparatus 100 may have a reservoir 102 that may receive a volume of liquid. The reservoir 102 may be rectangular in cross-section and include a front side 104, a left side 106, a right side 108, a back side 110, a top side 112, and a bottom side 114. The plurality of sides 104, 106, 108, 110, 112, 114 may be coupled to one another to define an inner volume (not shown) of the reservoir 102.

The left and right side 106, 108 may have at least one indentation 116 defined therein. The indentation 116 may be implemented in a portion of both the left and right side 106, 108. Further, the indentation 116 may be defined by an indentation plane slightly offset from, but parallel to, a side plane created by the surface of either the left or right side 106, 108. The indentation 116 may have at least one wall 118 extending from the indention plane to the side plane. In different embodiments, the indentation 116 provides for added structural integrity of the left and right side 106, 108.

While specific indentations have been described in detail, the left and right side 106, 108 may also have other similar known elements incorporated therein to increase the structural integrity of the sides. For example, instead of indentations 116, V-shaped channels may be incorporated into the left and right side 106, 108. Accordingly, this disclosure is not limited to any particular configuration. Further, the above teachings for the left and right side 106, 108 are equally appropriate for the front and back sides 104, 110.

The reservoir 102 may be composed of a plurality of different materials. In one embodiment, the reservoir 102 may be a plastic composition of sufficient thickness to allow the reservoir 102 to retain a liquid without substantial deformation. In another embodiment, various metal compositions such as steel, aluminum, or the like may be used. In yet another embodiment, the material may be substantially translucent to allow the liquid level to be identified from the exterior of the reservoir. Other materials may also be used for the reservoir 102. Therefore, this disclosure is not limited to any particular material composition.

The measurement and containment apparatus 100 may also include a measurement apparatus 120 selectively fluidly coupled thereto. The measurement apparatus 120 may be a partially clear and substantially cylindrical member 121 extending from a location proximate to the bottom side 114 to a location proximate to the top side 112. Further, the cylindrical member 121 may define a volume substantially smaller than the volume defined by the reservoir 102. In one embodiment, the measurement apparatus 120 includes a first plurality of markings 132 and a second plurality of markings 134 located thereon. The first plurality of markings 132 may be used to indicate the volume of liquid located within the measurement apparatus 120. The second plurality of markings 134 may be used to indicate the volume of a liquid located within the reservoir 102 when the measurement apparatus 120 is fluidly coupled thereto. The first and second plurality of markings 132, 134 may utilize a visible liquid level 130 to correlate liquid height to the volume of liquid disposed therein.

A valve 122 may be mechanically coupled between the measurement apparatus 120 and the reservoir 102. The valve 122 may be selectively switched between a first position and a second position (not shown). In the first position, the valve 122 may fluidly isolate the contents of the measurement apparatus 120 from the contents of the reservoir 102. In the second position, the valve 122 may fluidly couple the measurement apparatus 120 to the reservoir 102. When the valve 122 is in the second position, the second plurality of markings 134 may be used to indicate the volume of liquid located in the reservoir 102. Alternatively, when the valve 122 is in the first position, the first plurality of markings 132 may be used to indicate the volume of liquid located in the measurement apparatus 120.

In one embodiment, the first and second plurality of markings 132, 134 are located on the cylindrical member 121 of the measurement apparatus 120. At this location, the second plurality of markings 134 identify the volume of liquid in the measurement apparatus 120, but the first plurality of markings 132 identifies the amount of liquid in the reservoir 102 when the valve 122 is in the second position. In a different embodiment, the first plurality of markings 132 are on the reservoir 102 while the second plurality of markings 134 are on the measurement apparatus 120. In this configuration the first and second plurality of markings 132, 134 identifies the volume of liquid in the reservoir 102 and the measurement apparatus 120 regardless of the valve 122 position.

In a different embodiment, the valve 122 is electronically controlled by a controller (not shown). In this embodiment, the valve 122 transitions from the first position to the second position electronically. Additionally, in yet another embodiment, the measurement apparatus 120 includes an electronic sensor (not shown) coupled thereto. The electronic sensor transmits a signal to the controller indicative of the volume of both the reservoir 102 and the measurement apparatus 120 instead of, or in addition to, using the first and second plurality of markings 132, 134.

In this embodiment, the user programs a processor of the controller to take electronic measurements at different intervals and with the valve 122 in different positions. The controller then displays to the user information regarding the volume of liquid removed from the reservoir 102 and/or the volume of liquid removed from the measurement apparatus 120 after a machine (not shown) using a liquid is operated for at least one cycle.

The cylindrical member 121 of the measurement apparatus 120 may also be sufficiently sized to allow the tube 124 to become disposed therein. The tube 124 may enter the measurement apparatus 120 at a location proximate to the top side 112. The tube 124 may also extend sufficiently into the measurement apparatus 120 to allow an intake end 126 to provide for a liquid intake location close to the valve 122. The tube 124 may further be coupled to the machine that removes liquid from the measurement apparatus 120. When the valve 122 is in the first position, the tube 124 may remove liquid from the measurement apparatus 120 without affecting the liquid in the reservoir 102. When the valve 122 is in the second position, the tube 124 may effectively remove liquid from the reservoir 102 because the measurement apparatus 120 is fluidly coupled to the reservoir 102.

The ability of the measurement and containment apparatus 100 to provide two separate liquid level readings allows for increased accuracy in determining the amount of liquid used by the machine in a given time period of operation. For example, if the valve 122 is in the second position, the volume of liquid removed from the reservoir 102 may be determined by comparing the liquid height with the second plurality of markings 134 prior to liquid removal with the liquid height post liquid removal. In this embodiment, the second plurality of markings 134 is utilized to measure substantially large changes in the amount of liquid removed by the tube 124.

In a similar embodiment, the user switches the valve 122 to the first position, and allows the tube 124 to withdraw liquid only from the isolated measurement apparatus 120. The user observes the liquid level shown on the first plurality of markings 132 both before and after the liquid is withdrawn from the isolated measurement apparatus 120. The user may then calculate the difference between the first liquid level and the second liquid level to determine the overall volume of liquid removed by the tube 124.

Isolating the liquid in the measurement apparatus 120 prior to removing any liquid provides for a more accurate determination of the liquid height values than allowing the measurement apparatus 120 to be fluidly coupled to the reservoir 102. In one nonlimiting example, the reservoir 102 may contain 9.5 liters. The tube 124 may withdraw 3.6 milliliters (mL) of liquid from the reservoir 102 when the valve 122 is in the second position. The 3.6 mL removed from the 9.5 liters contained in the reservoir 102 may show only a 0.1 millimeter (mm) drop in the liquid height of the reservoir 102. The 0.1 mm drop in liquid height may be substantially indiscernible. Accordingly, the liquid level 130 shown by the measurement apparatus 120 may have changed minimally. In this embodiment, the second plurality of markings 134 is configured to determine larger changes in volume. To provide a more noticeable change in liquid level 130 when only a small volume of liquid is being removed, the valve 122 should be transitioned to the first position so the measurement apparatus 120 indicates a more noticeable change of the overall volume of liquid removed by the tube 124 as explained in more detail below.

In a similar embodiment, however, the 9.5 liters may be inserted into the reservoir 102 while the valve 122 is in the second position. The reservoir 102 may fill the measurement apparatus 120 until it reaches a state of equilibrium and the reservoir 102 and the measurement apparatus 120 both show the same liquid level 130. The valve 122 may then be transitioned to the first position, fluidly isolating the liquid in the measurement apparatus 120. In one nonexclusive embodiment, the measurement apparatus 120 may contain about 400 mL when the measurement and containment apparatus 100 has been filled with 9.5 liters. The tube 124 may similarly remove 3.6 mL from the isolated measurement apparatus 120. Accordingly, a 4 mm drop in the liquid contained in the measurement apparatus 120 may have occurred. In this scenario, the 4 mm drop in liquid provides a noticeable change in the liquid level 130 shown by the first plurality of markings 132, yielding a more accurate determination of the overall change in volume after the machine has been in operation for a given amount of time. In the nonexclusive example above, the first plurality of markings 132 may be spaced 1 mm apart from one another with each 1 mm drop in liquid height indicating a 0.9 mL loss of liquid volume.

In different embodiments, the exact dimensions of the reservoir and the measurement apparatus affect the liquid level 130 change per volume loss. For example, a very tall, but very thin cylinder may contain the same volume of liquid as a very short but very wide cylinder. However, a relatively small change in volume in the tall cylinder may create a noticeable change in liquid level 130 while the same change in volume for the short cylinder may be substantially unnoticeable. Accordingly, the teachings of this disclosure are not limited to any particular dimensions. Consequently, the present disclosure includes different combinations of volumes and reservoir dimensions.

Another aspect of the present disclosure is the ability of the reservoir 102 to receive a disposable container 128 along the top side 112. The container 128 may be a typical size and shape as is known in the art for supplying a liquid chemical for a particular application. The container 128 may contain the liquid that is to become disposed within the reservoir 102.

Figure 2:
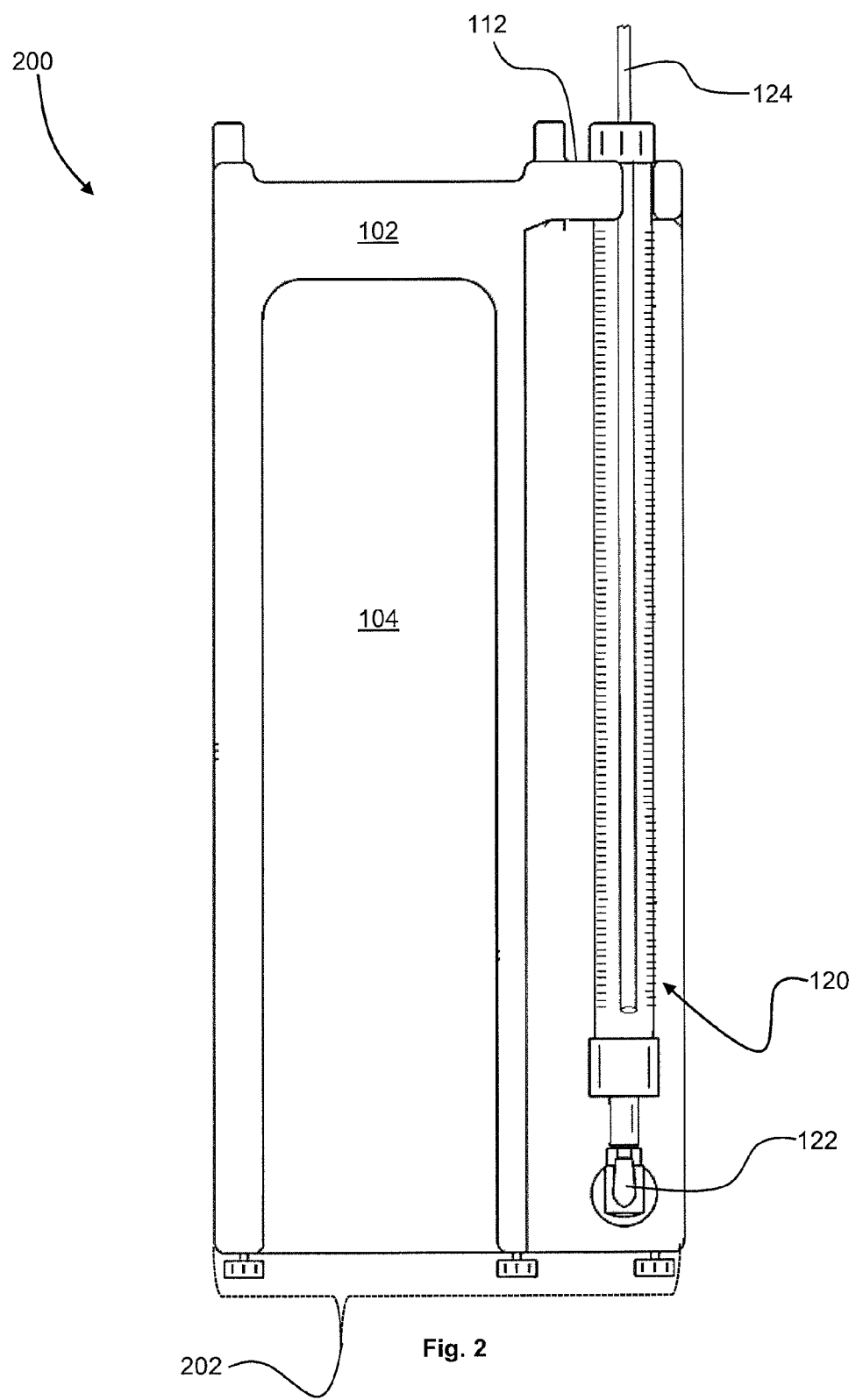
FIG. 2 is a front side view of the embodiment of FIG. 1b without the container.

Now referring to FIG. 2, a front side view 200 of the measurement and containment apparatus 100 is shown. The front side view 200 more clearly shows the measurement apparatus's 120 size relative to the reservoir 102. More particularly, the measurement apparatus 120 may extend from the top side 112 to the valve 122. Further, the measurement apparatus 120 may be only a fraction of a width 202 of the front side 104. The measurement apparatus 120 may be sized so that it may define a volume sufficient to contain at least as much liquid as may be needed for the machine utilizing the liquid to perform one cycle. Further, the measurement apparatus 120 may be sized so that it defines a volume that is small enough to provide for noticeable change in liquid level 130 for every wash cycle when the valve 122 is in the first position.

Figure 3:
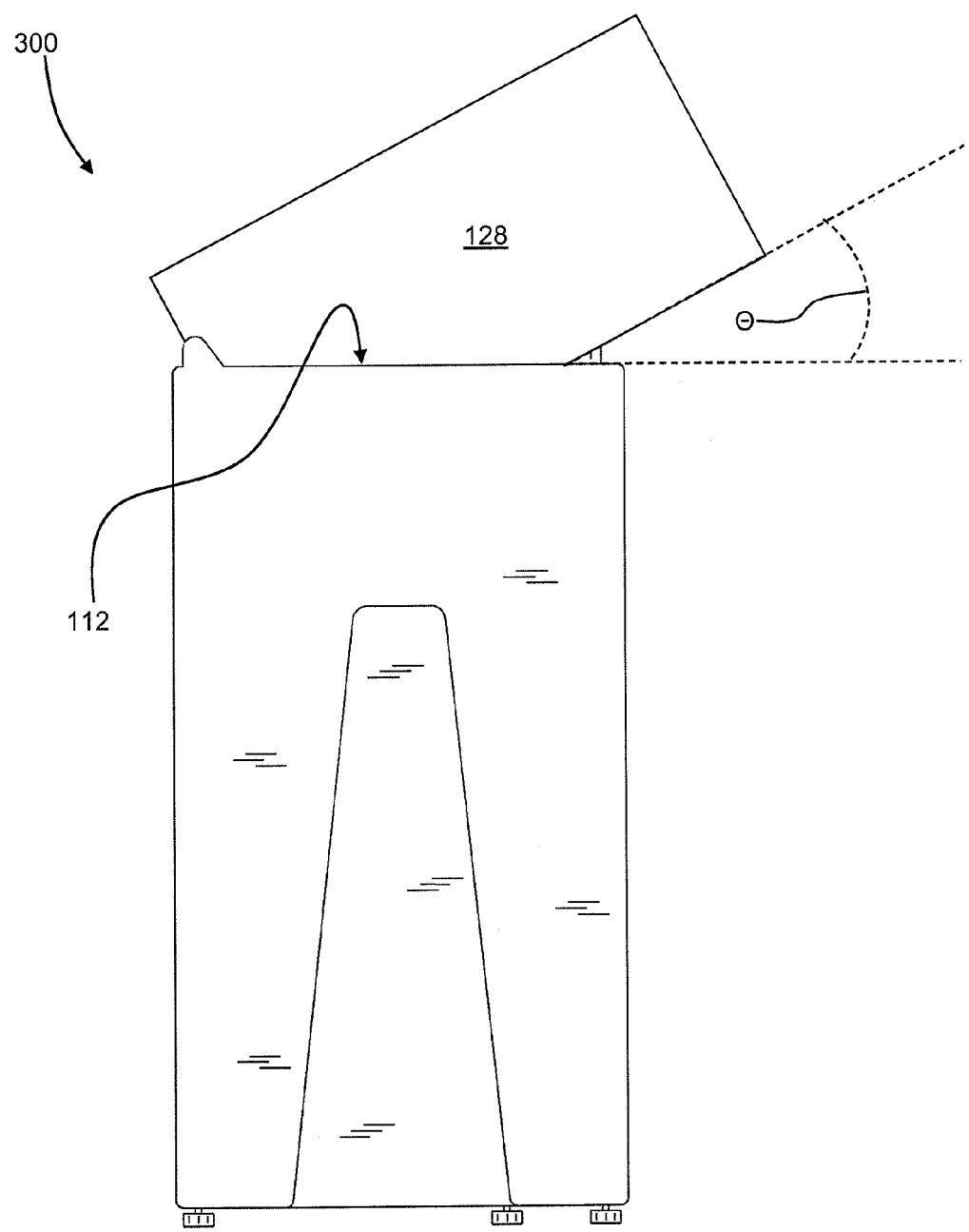
FIG. 3 is a left side view of the embodiment of FIG. 1b.

A left side view 300 of the measurement and containment apparatus 100 is shown in FIG. 3. In the left side view 300, the container 128 is shown in an angularly offset disposition. More specifically, the container 128 may be offset by an angle $\Theta$ relative to the top side 112. The angular offset $\Theta$ of the container 128 may be sufficient to allow the liquid contents of the container 128 to sufficiently flow to a spout (not shown) of the container 128.

Figure 4:
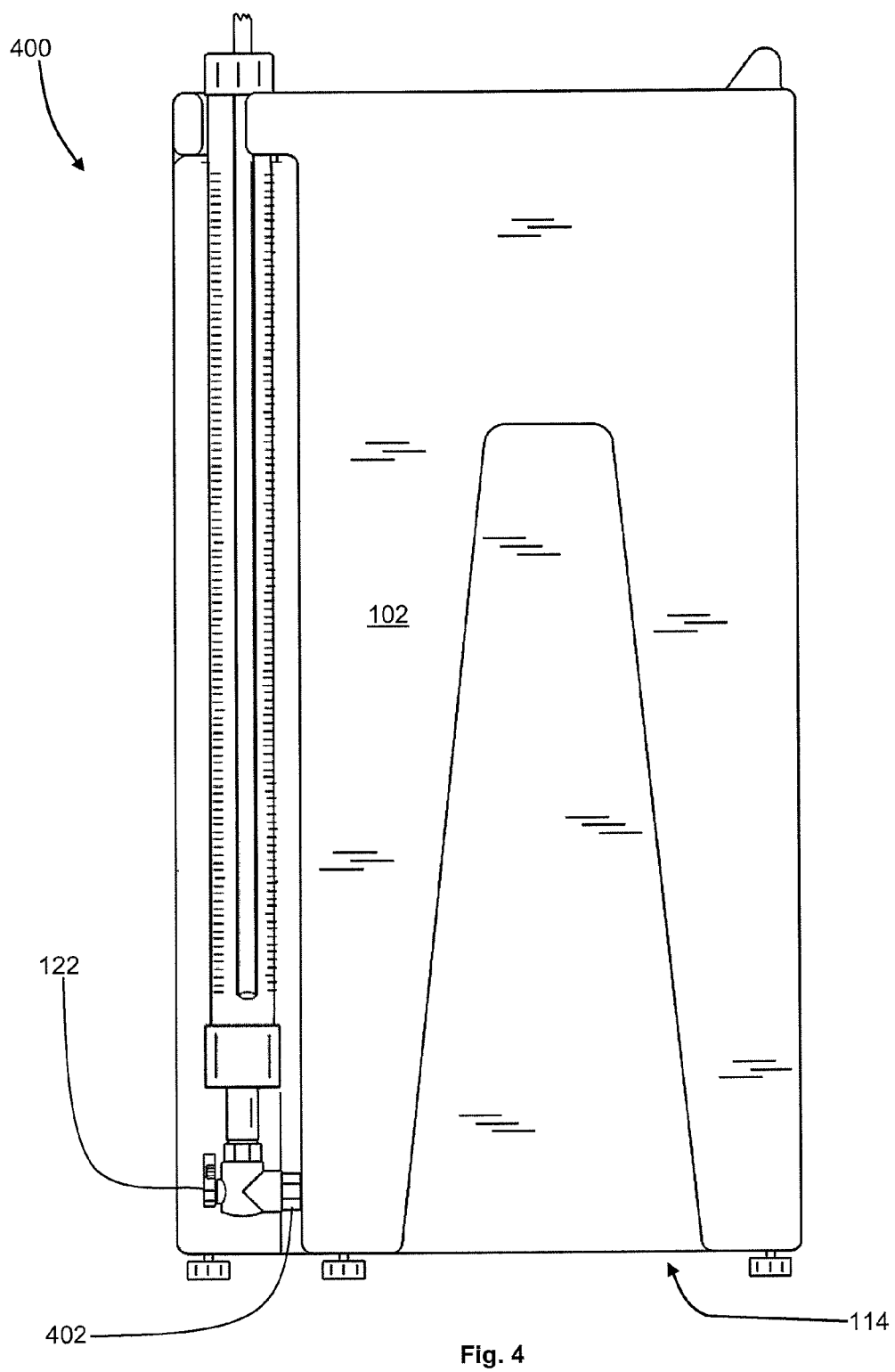
FIG. 4 is a right side view of the embodiment of FIG. 2.

Referring now to FIG. 4, a right side view 400 is shown. The right side view 400 more clearly shows a liquid coupling location 402 of the valve 122 to the reservoir 102. In one embodiment, the liquid coupling location 402 is substantially adjacent to the bottom side 114. By locating the liquid coupling location 402 proximate to the bottom side 114, the liquid disposed in the reservoir 102 enters the measurement apparatus 120 until the reservoir 102 is substantially empty.

Figure 5:
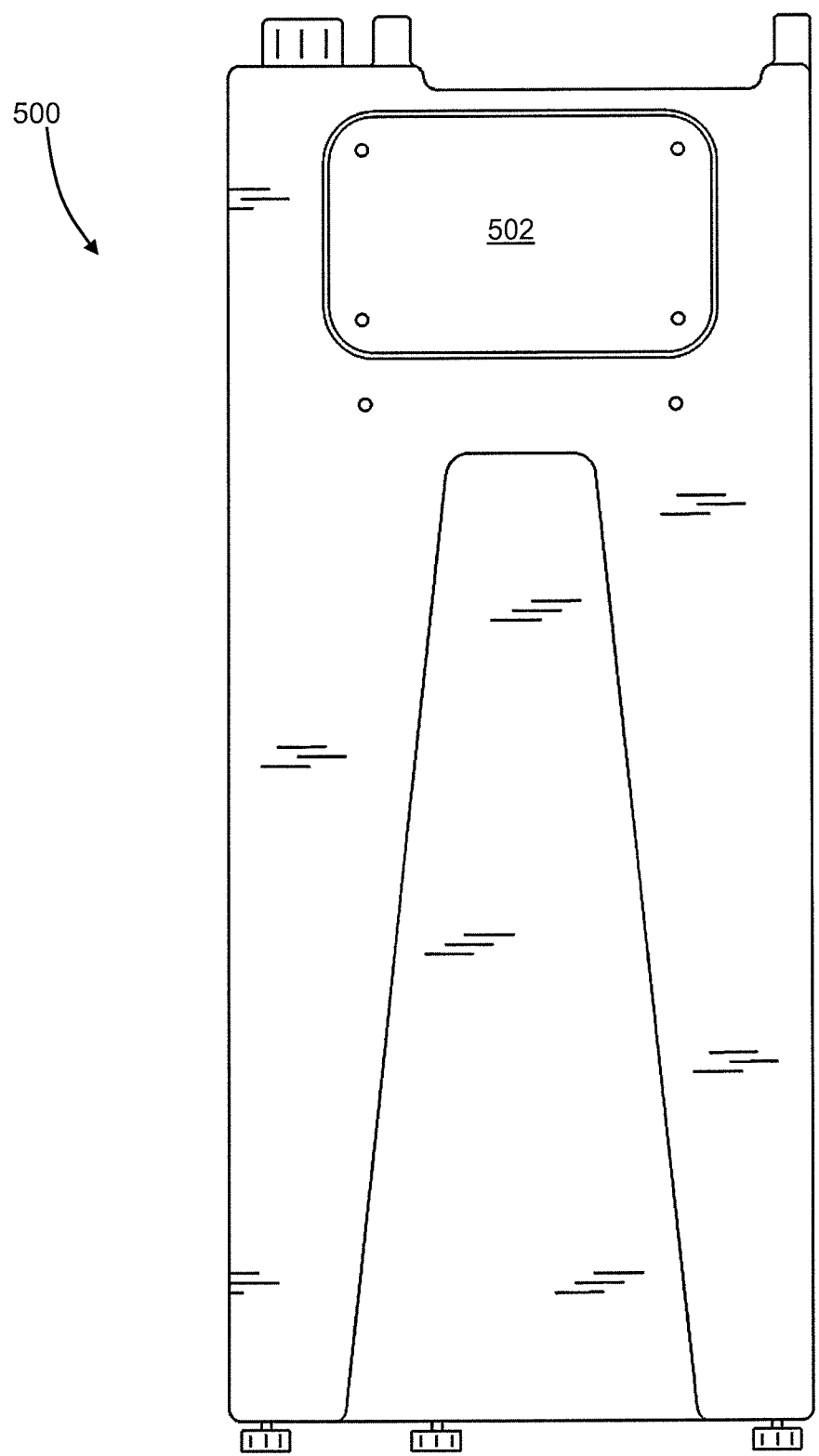
FIG. 5 is a back side view of the embodiment of FIG. 2.

A back side view 500 of the measurement and containment apparatus 100 is shown in FIG. 5. More specifically, the back side view 500 shows a door 502 that substantially covers an opening (not shown). The door 502 may be coupled to the back side 110 through a plurality of fasteners. In one nonexclusive embodiment, the plurality of fasteners may be screws. In a different embodiment, the fasteners may be clips, adhesives, tape, or any other coupling method known in the art. When the reservoir 102 has been emptied of all liquid contents, or when the liquid contents need changed, the door 502 may be removed to provide easy access to a user for cleaning the internal portion of the reservoir 102.

Figure 6:
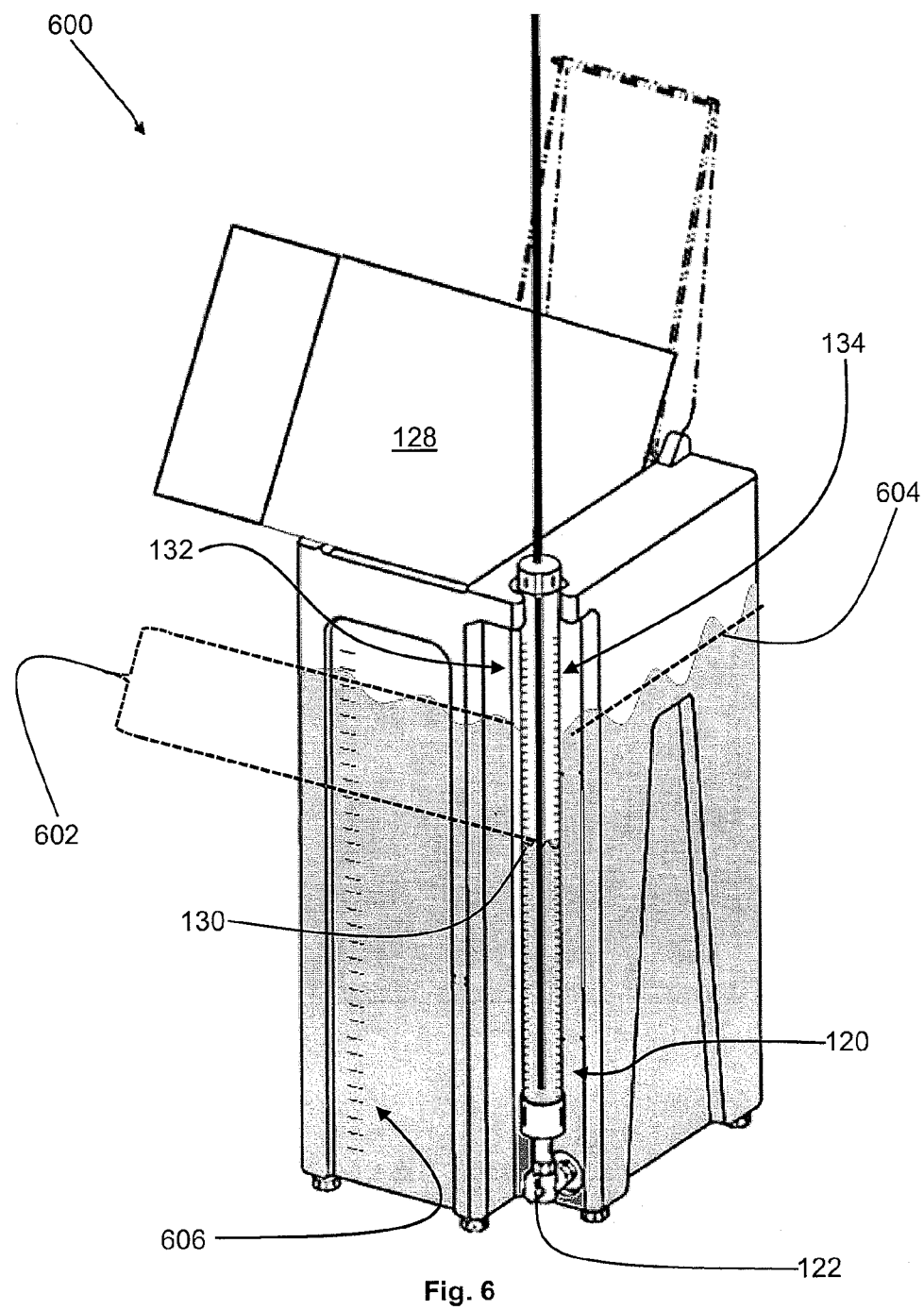
FIG. 6 is an elevated perspective view of the apparatus of FIG. 1b with a third plurality of markings.

Referring now to FIG. 6, one embodiment of an assembly 600 is shown. More particularly, the assembly 600 illustrates a change 602 in the liquid height of the measurement apparatus 120 compared to a reservoir liquid height 604. The change 602 in the liquid height of the measurement apparatus 120 is a result of the valve 122 being in the first position and the liquid being withdrawn from the measurement apparatus 120 through the tube 124 during a wash cycle. The reservoir liquid level 604 of the reservoir 102 is also shown in FIG. 6. When liquid is withdrawn from the measurement apparatus 120 while the valve 122 is in the first position, the liquid level 130 of the measurement apparatus 120 may be different than the reservoir liquid level 604. When the valve 122 is returned to the second position, the reservoir liquid level 604 and the liquid level 130 of the measurement apparatus 120 may equalize to the same level.

A third plurality of markings 606 is also shown in FIG. 6. The third plurality of markings 606 may be coupled to the reservoir 102 to help the user determine the volume of liquid in the reservoir 102, the measurements apparatus 120, or both. The third plurality of markings 606 may be supplemental to the first and second plurality of markings 132, 134. Alternatively, the third plurality of markings 606 may be utilized instead of the first and second plurality of markings 132, 134. In different embodiments, the markings are placed in many locations on the measurement and containment apparatus 100 and this disclosure is not limited to any particular location.

Figure 7:
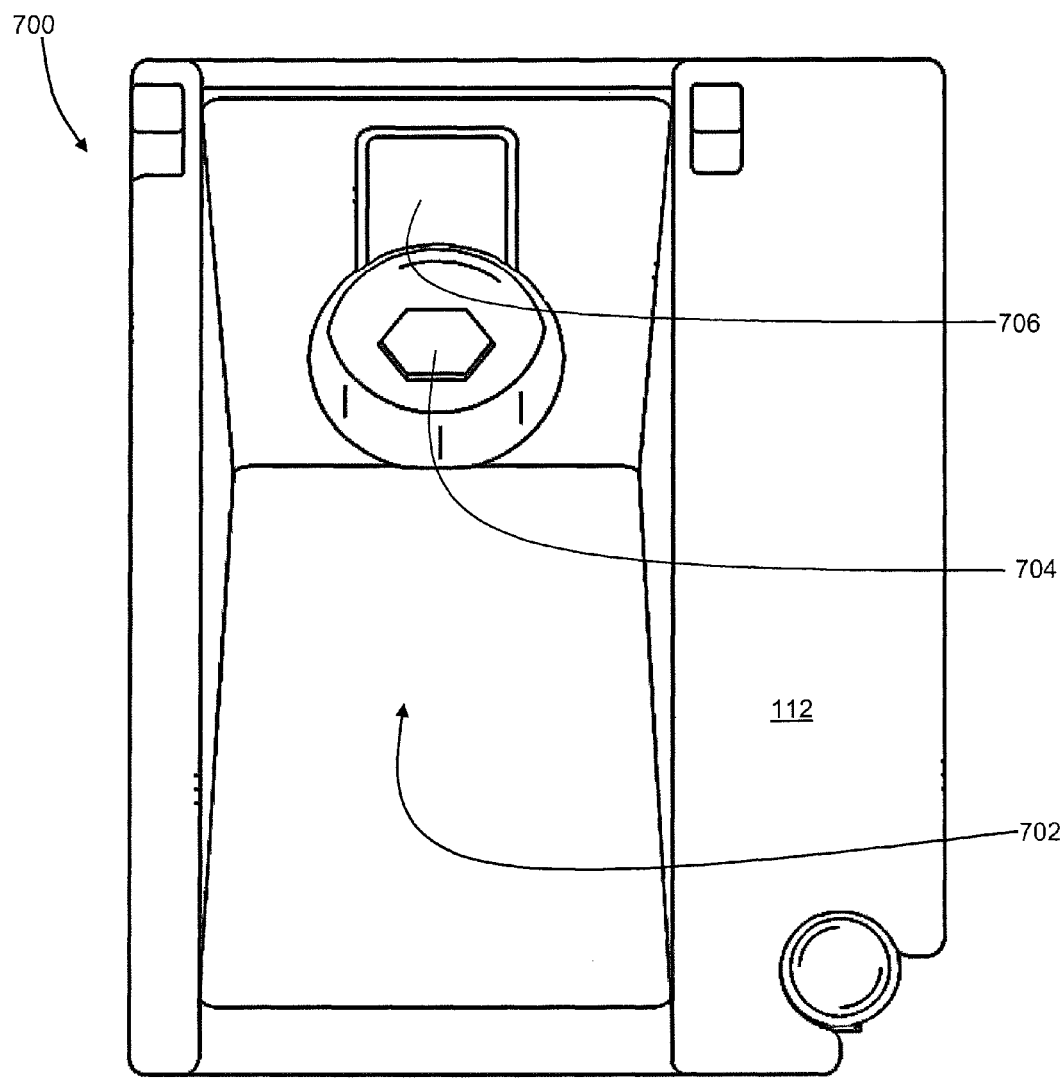
FIG. 7 is a top side view of the embodiment of FIG. 2 showing a fill feature.

A first configuration 700 of one embodiment is shown in FIG. 7. In the first configuration 700, the top side 112 is illustrated separated from the disposable container 128. Further, a cavity 702 is shown for receiving the container 128. The cavity 702 may have an orifice 704 designed to receive the spout of the container 128. Additionally, the cavity 702 may define a recess 706 designed to accommodate the various handling features of the container 128.

The orifice 704 may also have a piercing element (not shown) disposed therearound. The piercing element may have a diameter small enough to fit within the spout of the container 128 but large enough to substantially allow a liquid to flow therethrough.

The cavity 702 may be correspondingly sized to receive the container 128. Further, the cavity 702 may be designed to receive the container 128 at the angle $\Theta$ as shown in FIG. 3. Once the container 128 is placed within the cavity 702, the container 128 may be substantially stabilized by the cavity 702 to keep the container 128 from moving within the cavity 702. Further, the angel $\Theta$ may be such that it causes a majority of the liquid in the container 128 to travel through the spout and into the reservoir 102.

While a cavity 702 is described herein for receiving and stabilizing the container 128, the skilled artisan understands that the cavity 702 may also be any type of aperture that allows a liquid to be transitioned into the reservoir 102. That is to say, the cavity 702 may be a through hole sufficiently sized to allow a liquid to be poured into the reservoir. The liquid contents of the container 128 may be poured through the through hole and the container 128 may be discarded instead of remaining in the cavity.

Figure 8:
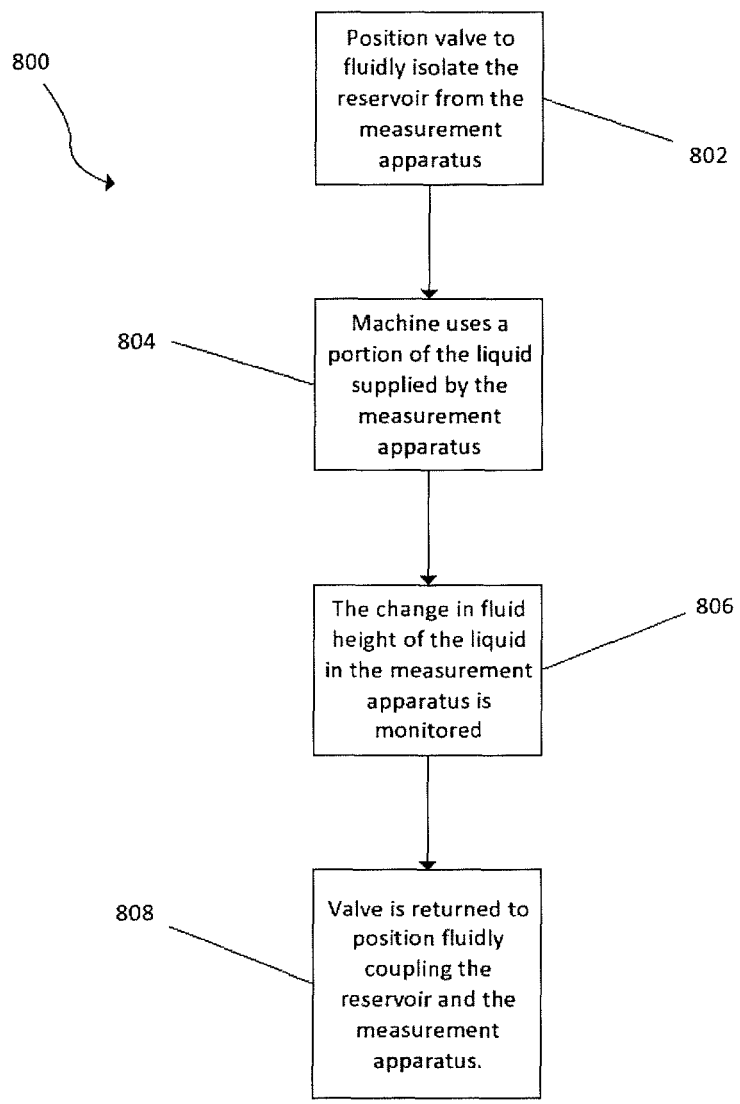
FIG. 8 is a block diagram showing a method of controlling a valve.

Referring now to FIG. 8, one nonexclusive method 800 for measuring the liquid used during at least one wash cycle is shown. More specifically, when the reservoir 102 and the measurement apparatus 120 are filled with a liquid and before the valve 122 is transitioned to the first position, the liquid level may be recorded in block 802. In block 804, the valve 122 may be transitioned to the first position and liquid may be drawn through the tube 124. Next, the drop in the liquid may be measured in block 806. Finally, in block 808, the valve 122 may be transitioned to back to the second position after the measurement has been obtained to allow the liquid level of the measurement apparatus 120 to equalize with the liquid level of the reservoir 102.

A cleaning method may also be initiated by uncoupling the door 502 from the reservoir 102. The user may rinse the internal portion of the measurement and containment apparatus 100 through the exposed opening of the uncoupled door 502. Finally, the user may replace the door 502 and couple it to the reservoir 102.

An apparatus use flowchart 900 is shown in FIG. 9. In one nonexclusive embodiment, a user may position the measurement and containment apparatus 100 at a desired location in block 902. In block 904, the user may insert the tube 124 into the measuring apparatus 120 and further couple the tube 124 to the machine that is withdrawing the liquid in block 906. The user may then remove a cap from the container 128 that contains a liquid chemical required by the machine in block 908. In block 910, the user may then position the container 128 within the cavity 702 such that the piercing element pierces a seal on the spout of the container 128 and the liquid contents of the container 128 flow into the reservoir 102.

The user may then orient the valve 122 in the second position to allow the measurement apparatus 120 to fill with the liquid to the same liquid level 130 as the reservoir 102 in block 912. At this point, the system may operate by using the tube 124 to withdraw liquid from the measurement and containment apparatus 100 as shown in block 914. In block 916, as liquid is withdrawn from the measurement apparatus 120, it may be substantially simultaneously refilled from the reservoir 102 through the valve 122.

Alternatively, if the user wants to monitor the amount of liquid withdrawn from the measurement and containment apparatus 100, the user may change the valve 122 to the first position after the reservoir liquid level 604 has become substantially the same as the liquid level 130 of the measurement apparatus 120. In block 918, as the tube 124 removes liquid from the measurement apparatus 120, the measurement apparatus is not refilled by liquid from the reservoir 102. Accordingly, the user may record a first level indicated by the first plurality of markings 132 before the machine executes one or more cycle. After the machine has executed the one or more wash cycle, the user may record a second level indicated by the first plurality of markings 132. The user may then compare the first level indicated by the first plurality of markings 132 with the second level indicated by the first plurality of markings 132 to determine the overall volume of liquid withdrawn during the machine cycle.

The user may use the overall volume withdrawn during a cycle to calculate the cost of each cycle by determining the amount of liquid used in each cycle. In one nonlimiting example, the amount of liquid withdrawn for each cycle may be correlated to a percentage of the overall liquid supplied by the container 128. Further, the cost of the filled container 128 may be correlated to the percentage of the contents used per cycle. Accordingly, the cost per cycle may be determined by the user.

The present disclosure is not limited to a car wash. Further, the term "car wash" is not limited in the application to the above teachings for a "car". The wash systems described herein apply to any type of automated or non-automated wash system and are not limited. In addition, in other embodiments the measurement and containment apparatus 100 is coupled to a hand-held unit to be used by an individual. For example, trucks, planes, sports utility vehicles, all-terrain vehicles, motorcycles, mobile homes and other objects may utilize a wash system incorporating the teachings of this disclosure.

The embodiments are utilized in a plurality of different types of car wash systems and this disclosure is not limited to any particular one. In one example, a drive-thru car wash system where the vehicle is driven or pushed through the car wash implements the teachings of this disclosure. Further, a stationary automatic car wash, where equipment revolves around a stationary vehicle, incorporates one or more of the teachings of this disclosure. Alternatively, a self-service or do it yourself style car wash may use the teachings of this disclosure. The present disclosure is applicable to any type of car wash system.

Alternatively, the above teachings may be implemented in other applications outside of car wash systems. In one non-limiting example, the teachings of this disclosure are applied to measure the amount of syrup flavoring used in a carbonated soda dispenser. Further still, the above teachings may be applied in a chemistry lab to determine more precisely the amount of a certain chemical added to a mixture. The teachings may be used to more accurately determine the volume of liquid withdrawn from a reservoir of any size. Accordingly, this disclosure is not limited to a specific application.

While embodiments incorporating the principles of the present disclosure have been disclosed hereinabove, the present disclosure is not limited to the disclosed embodiments. Instead, this application is intended to cover any variations, uses, or adaptations of the invention using its general principles. Further, this application is intended to cover such departures from the present disclosure as come within known or customary practice in the art to which this disclosure pertains and which fall within the limits of the appended claim.

The invention claimed is:

1. A liquid measurement and containment apparatus, comprising:
    a reservoir having a plurality of side walls, a bottom surface, a top surface, and defining a first interior region configured to hold a liquid therein;
    a cavity defined in a portion of the top surface;
    an orifice defined in the cavity providing access into the first interior region;
    a valve having a first position and a second position, the valve coupled to the reservoir on one of the plurality of side walls proximate to the bottom surface;
    a measurement apparatus extending from a top portion to a bottom portion, coupled to the valve, and defining a second interior region;
    a tube extending through the top portion and disposed at least partially within the second interior region of the measurement apparatus; and
    an intake end of the tube positioned proximate to the bottom portion;
    wherein the valve fluidly isolates the first interior region from the second interior region when the valve is in the first position;
    further wherein the valve fluidly couples the first interior region with the second interior region when the valve is in the second position;
    further wherein, when the valve is in the second position, liquid travels from the first interior region to the second interior region before being withdrawn through the intake end of the tube;
    further wherein, the cavity corresponds in size with a container and is adapted to receive the container partially within the cavity where a portion of the container is within the orifice to transfer liquid from the container to the interior region.

2. The liquid measurement and containment apparatus of claim 1, further comprising:
    a first plurality of markings that correlate a first liquid level with a first liquid volume; and a second plurality of markings that correlate a second liquid level with a second liquid volume;

wherein the location of the first liquid level along the first plurality of markings is indicative of the volume of liquid located within the reservoir and the location of the second liquid level along the second plurality of markings is indicative of the volume of liquid located within the second interior region.

3. The liquid measurement and containment apparatus of claim 2, wherein the first plurality of markings and the second plurality of markings are on the reservoir.

4. The liquid measurement and containment apparatus of claim 2, wherein the first plurality of markings and the second plurality of markings are on the measurement apparatus.

5. The liquid measurement and containment apparatus of claim 1, wherein the liquid disposed in the second interior region of the measurement apparatus is selectively removable through the top portion via the tube.

6. The liquid measurement and containment apparatus of claim 5, wherein when the valve is in the first position, the tube only withdraws liquid located in the second interior region;

further wherein, the tube only withdraws liquid located in the second interior region when the valve is in the second position, wherein liquid from the first interior region enters the second interior region as the tube withdraws liquid.

7. The liquid measurement and containment apparatus of claim 1, further comprising a door removeably coupled to the reservoir, wherein the door is removable from the reservoir to allow access to the first interior region.

8. An assembly for monitoring the volume of liquid used in a system, comprising:
 a machine that uses at least one fluid;
 a liquid measurement and containment apparatus, comprising:
  a reservoir having a plurality of side walls, a bottom surface, a top surface and defining a first interior region configured to hold a liquid therein;
  a cavity defined in a portion of the top surface;
  an orifice defined in the cavity providing access into the first interior region;
  a valve having a first position and a second position, the valve coupled to the reservoir on one of the plurality of side walls proximate to the bottom surface;
  a measurement apparatus extending from a top portion to a bottom portion coupled to the valve and defining a second interior region;
  a tube extending through the top portion and disposed at least partially within the second interior region of the measurement apparatus; and
  an intake end of the tube positioned proximate to the bottom portion;
  wherein the valve fluidly isolates the first interior region from the second interior region when the valve is in the first position;
  wherein the valve fluidly couples the first interior region with the second interior region when the valve is in the second position;
  further wherein, when the valve is in the second position, liquid travels from the first interior region to the second interior region before being withdrawn through the intake end of the tube;
  further wherein, the cavity corresponds in size with a container and is adapted to receive the container partially within the cavity where a portion of the container is within the orifice to transfer liquid from the container to the interior region;
  wherein the tube fluidly couples the machine to the liquid measurement and containment apparatus.

9. The assembly of claim 8, further wherein the machine is configured to operate in one or more cycles and to discharge a predetermined volume of liquid in each cycle.

10. The assembly of claim 9, further comprising a plurality of markings disposed on the liquid measurement and containment apparatus.

11. The assembly of claim 10, wherein when the valve is in the first position, the plurality of markings indicate a volume of the liquid located in the measurement apparatus.

12. The assembly of claim 10, wherein when the valve is in the second position, the plurality of markings indicate a volume of the liquid located in the reservoir.

13. The assembly of claim 10, wherein the plurality of markings indicate both a volume of liquid located in the measurement apparatus and a volume of liquid located in the reservoir.

14. The assembly of claim 10, wherein the plurality of markings are configured to be monitored during the cycle to indicate a volume of liquid used by the machine.

15. A method of determining the liquid consumption of a machine, comprising:
 providing a liquid measurement and containment apparatus, comprising:
  a reservoir having a plurality of side walls, a bottom surface, a top surface, and defining a first interior region configured to hold a liquid therein;
  a cavity defined in a portion of the top surface;
  an orifice defined in the cavity providing access into the first interior region;
  a valve having a first position and a second position, the valve coupled to the reservoir on one of the plurality of side walls proximate to the bottom surface;
  a measurement apparatus extending from a top portion to a bottom portion coupled to the valve and defining a second interior region;
  a tube extending through the top portion and disposed at least partially within the second interior region of the measurement apparatus; and
  an intake end of the tube positioned proximate to the bottom portion;
  wherein the valve fluidly isolates the first interior region from the second interior region when the valve is in the first position;
  further wherein the valve fluidly couples the first interior region with the second interior region when the valve is in the second position;
  further wherein, when the valve is in the second position, liquid travels from the first interior region to the second interior region before being withdrawn through the intake end of the tube;
  further wherein, the cavity corresponds in size with a container and is adapted to receive the container partially within the cavity where a portion of the container is within the orifice to transfer liquid from the container to the interior region;
 providing a machine that uses at least one liquid during a machine operation;
 fluidly coupling the machine to the measurement apparatus with the tube;
 placing the container partially within the cavity and aligned with the orifice;
 filling the reservoir through the orifice with a volume of a liquid from the container;

transitioning the valve to the second position to allow the liquid to enter the measurement apparatus;

transitioning the valve to the first position after at least some of the liquid has entered the measurement apparatus;

recording a first liquid height in the measurement apparatus;

operating the machine for a period of time;

recording a second liquid height of the measurement apparatus;

comparing the first liquid height to the second liquid height to determine the amount of liquid used by the machine during the machine operation.

16. The method of claim 15, wherein the recording a first liquid height step is done by comparing the first liquid height to a plurality of markings and the recording a second liquid height step includes comparing the second liquid height to the plurality of markings.

17. The method of claim 16, wherein the plurality of markings indicate a first liquid volume in the measurement apparatus for the first liquid height and the plurality of markings indicate a second liquid volume for the second liquid height.

18. The method of claim 17, further comprising:
designating the first liquid volume with the plurality of markings; and
designating the second liquid volume with the plurality of markings;
wherein, a total volume of liquid used during a machine operation is calculated by subtracting the first liquid volume from the second liquid volume.

19. The method of claim 18, further comprising:
operating the machine for one or more cycles;
determining a volume of liquid used in each cycle by dividing the total volume of liquid used by the number of cycles for which the machine was operated.

20. The method of claim 15, further comprising:
providing a liquid level sensor in the measurement apparatus, a processor of a controller, and a display;
transmitting, with the liquid level sensor, the liquid level of the measurement apparatus to the processor;
controlling, with the processor, the operating the machine step, the recording the first liquid height step, and the recording the second liquid height step;
correlating, with the processor, the first liquid height to a first volume and the second liquid height to a second volume;
determining, with the processor, a volume difference between the first volume and the second volume and communicating the volume difference with the display.

* * * * *